Oct. 27, 1953 — A. C. ALLEN — 2,656,713
APPARATUS FOR INDICATING UNBALANCE IN ROTARY BODIES
Filed May 14, 1947 — 3 Sheets-Sheet 1

Inventor:
Arthur C. Allen
By Hinkle, Horton, Ahlberg, Hausmann & Klipper
Attorneys.

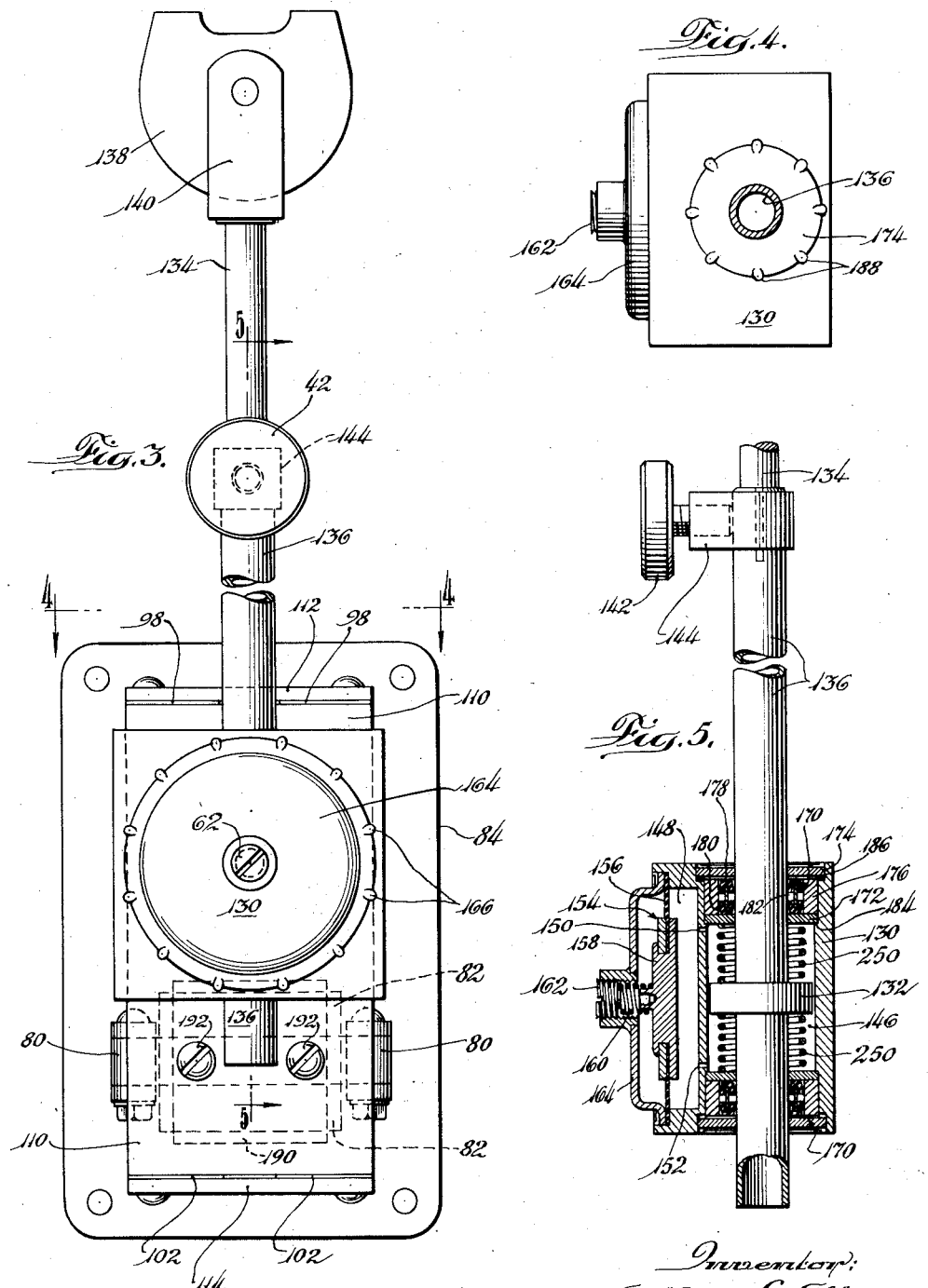

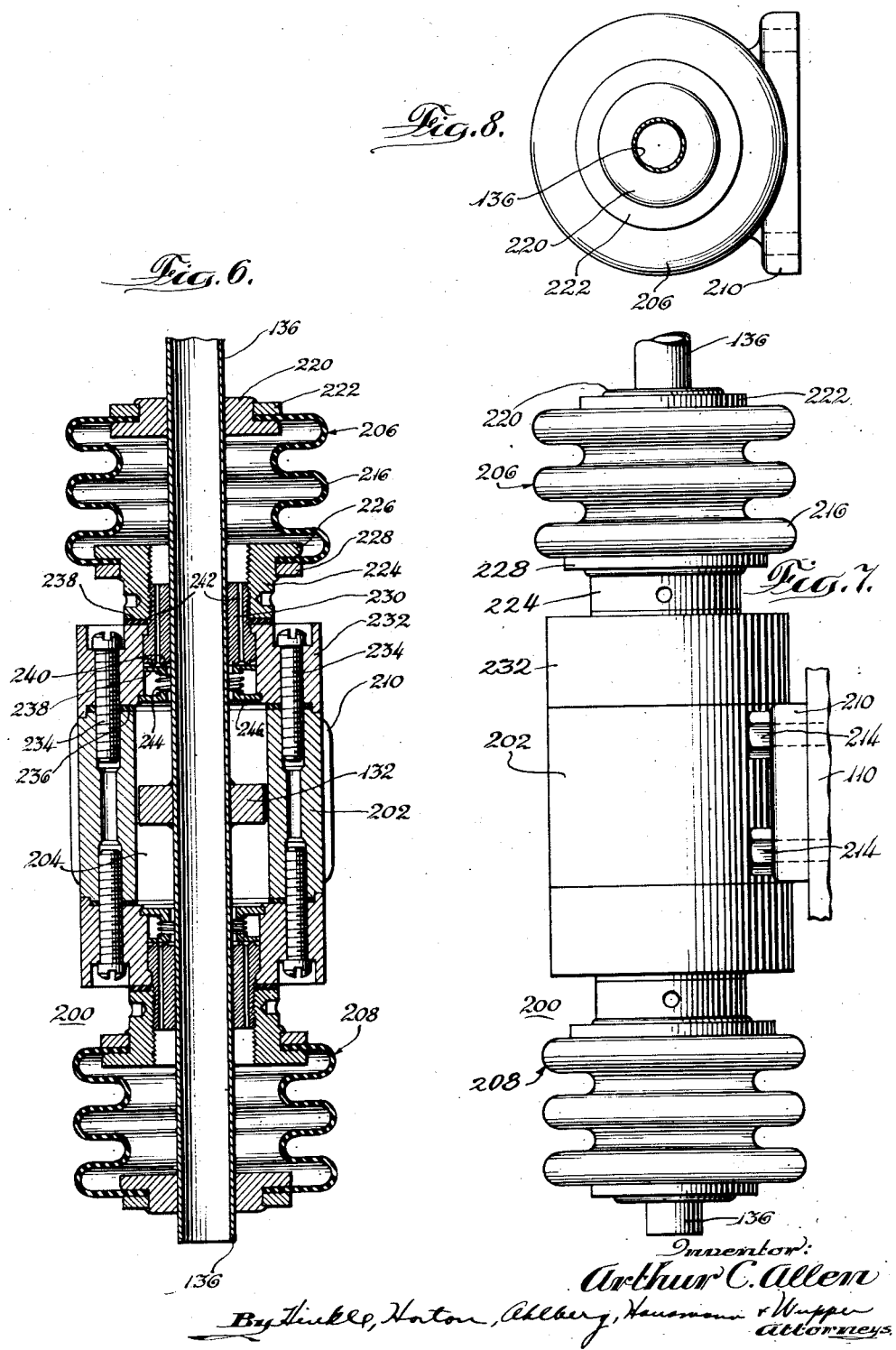

Patented Oct. 27, 1953

2,656,713

UNITED STATES PATENT OFFICE 2,656,713

APPARATUS FOR INDICATING UNBALANCE IN ROTARY BODIES

Arthur C. Allen, Chicago, Ill., assignor to Stewart-Warner Corporation, Chicago, Ill., a corporation of Virginia Application May 14, 1947, Serial No. 748,049

12 Claims. (Cl. 73—66)

1

The present invention relates to balancing and more particularly to a new and improved apparatus for checking the balance of and for balancing rotating bodies, such as vehicle wheels.

In the past many different methods of and apparatus for balancing have been developed and used with varying degrees of success. In one known arrangement, the locus of unbalance is determined at the resonant frequency of the system. This system may comprise, for example, an elastic damped vibrational system like a freely rotating automobile wheel, which is preferably brought up to a speed above the resonant speed and then allowed freely to decelerate to the resonant speed at which a check of the unbalance is made. It is known that at the resonant frequency the amplitude of the resulting vibrations or displacement is a maximum as is the velocity of the vibration or displacement. It is known further that at this speed the velocity is in phase with the force of the unbalance, i. e., with the locus of unbalance, and that the displacement lags the force by 90 degrees. The balancing apparatus includes circuits for flashing a stroboscopic light source in synchronism with the vibrations and correlating the flashing with the rotating body to determine the locus of unbalance.

In certain of the prior art arrangements the light source is flashed at the moment the velocity of the vibration is greatest. This is accomplished by velocity responsive means, such as a voltage generator including a pick-up coil, actuated by the vibration of the rotating system either in a radial or axial direction depending upon whether the static or dynamic balance is to be checked. In this type of arrangement, if the voltage generator is arranged to be responsive to vertical upward velocity of the rotating body and the light source is flashed at a time when the upward vibrational velocity is at its instantaneous maximum value, the rotating body will appear stationary in the position at which the force is a maximum upward. If the wheel is then brought to rest with the wheel in its apparent stationary position, the locus of unbalance will be at the top and a weight can be added at the bottom of the body to oppose and neutralize the force of unbalance.

In another arrangement, such as that disclosed and claimed in the copending application of Joseph O. Mesa, Serial No. 571,307, filed January 4, 1945, which on November 4, 1952, matured into Patent No. 2,616,288, and assigned to the assignee of this application, there is disclosed a method of and apparatus wherein the light source is

2 flashed in response to the displacement rather than the velocity and when the instantaneous vibrational displacement is substantially zero in a predetermined, preferably downward, direction. When the wheel is brought to rest in its apparent stationary position, the locus of unbalance will be at the bottom and the balance weight is added at the top of the wheel.

The present invention relates to apparatus of the latter character and has for its primary object the provision of a new and improved apparatus of this type.

A further object of the present invention is to provide a new and improved balancing apparatus comprising a simplified circuit and associated electromechanical means for flashing a stroboscopic light source in response to vibrational displacement and at a time when the vibrational displacement is substantially zero.

Another object of the present invention is to provide a new and improved mechanical means for actuating switch means controlling the flashing of the stroboscopic light source, which means includes novel means for centering the switch and its operating means relative to the body being balanced, and furthermore, which means includes automatically operating means for maintaining the switch and its actuating means in proper adjustment even though the body undergoing test should move during the test.

A further object of the present invention is to provide novel switch actuating means comprising hydraulic means for centering the switch actuating means relative to the body undergoing test so that the apparatus may be more readily used, adjusted and operated over a wide range of speeds and vibrational amplitudes.

Other objects and advantages of the present invention will become apparent from the ensuing description of certain embodiments thereof in the course of which reference is had to the accompanying drawings, in which:

Fig. 3 is a vertical elevational view of the apparatus shown in Fig. 2, the view being taken along the line 3—3 of Fig. 2;

Fig. 4 is a transverse cross sectional view of a portion of the apparatus shown in Fig. 3, the view being taken along the line 4—4 of that figure;

Fig. 5 is a reduced scale cross sectional view of the apparatus taken along the line 5—5 of Fig. 3;

Fig. 6 is an axial cross sectional view similar to Fig. 5 of a modified form of actuating and centering means;

Fig. 7 is an elevational view of the apparatus shown in Fig. 6; and

Fig. 8 is an end view thereof.

Figures 1, 2:
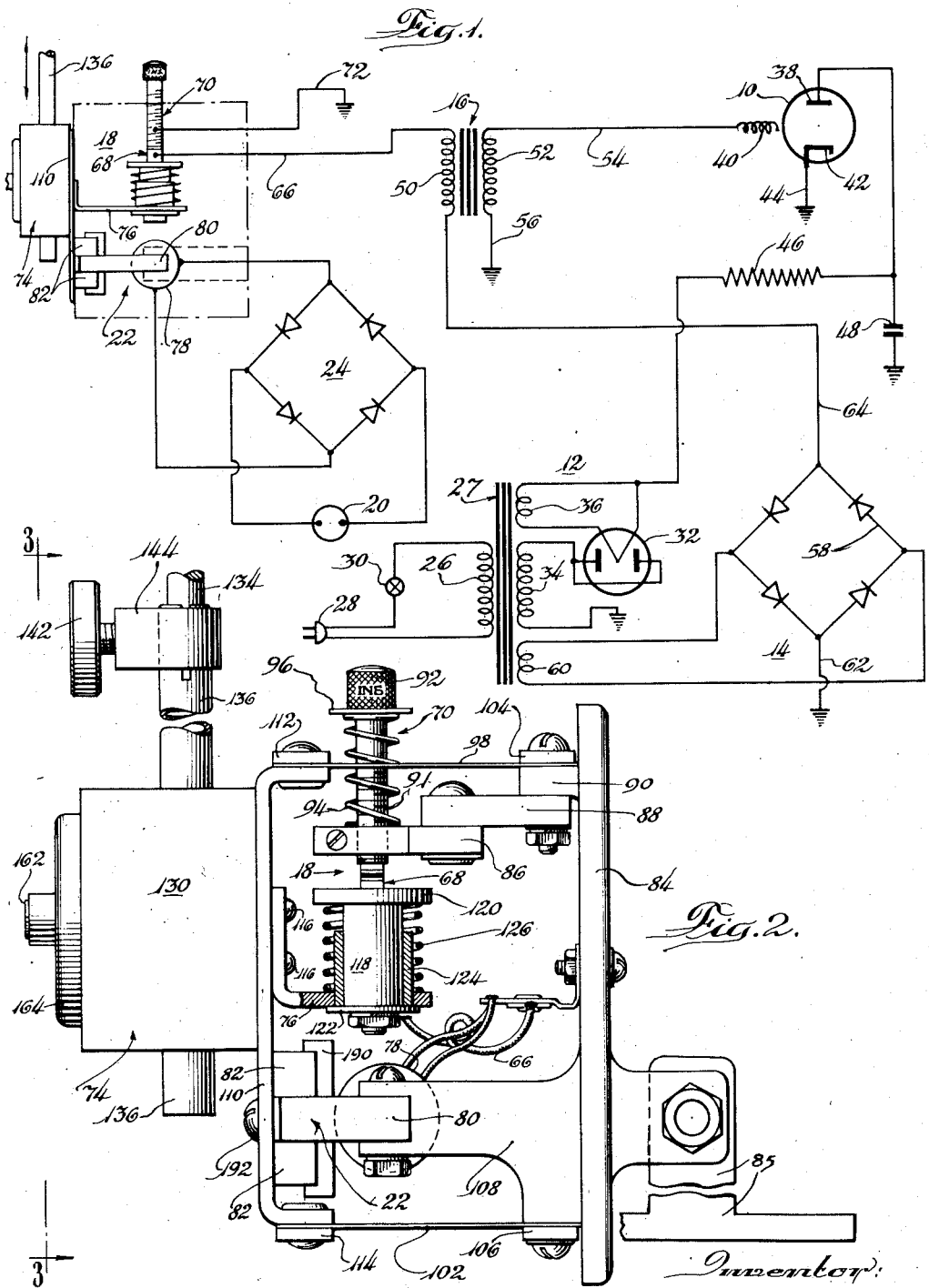
Fig. 1 is a schematic circuit diagram illustrating the apparatus.
Fig. 2 is a fragmentary and partly broken away view of the switch, switch actuating and switch centering means associated with the circuit of Fig. 1.

Referring first to Fig. 1, the apparatus of the present invention includes, in the main, stroboscopic light source 10, a source of power 12 for the light source, and means for energizing the light source periodically in synchronism with the vibrations of a body undergoing test and preferably in response to the vibrational displacement and when the displacement is zero, which means comprises a source of power 14, a transformer 16 and switch means 18 cooperatively associated with the body. In addition, the apparatus includes means for indicating the amplitudes of the vibrations comprising a meter 20, voltage generating means 22 and means including rectifying means 24 connecting the voltage generating means to the meter.

The two power supply means 12 and 14 are supplied with power from a suitable source, such as the usual 110-volt supply lines, through the primary winding 26 of a transformer 27. The primary winding is adapted to be connected to the power supply through a plug 28 and switch 30.

The power supply means 12 for the stroboscopic light source may take various forms and it is indicated as including a rectifier tube 32, which may be of the 5U4G type, the anodes of which are connected in parallel to a secondary winding 34 and the filament of which is connected across another secondary winding 36. The positive side of the rectified output voltage is connected to the anode 38 of the tube 10, which is preferably of the 648P1 type having an external control grid 40. It also includes a cathode 42 which is connected to ground through conductor 44. The anode connection also includes a charging resistor 46 through which a capacitor 48 is charged. The capacitor 48 is connected across the anode and cathode of the tube 10 with the result that each time the tube is fired, the capacitor discharges through the tube to provide a strong light flash.

In accordance with one of the features of the present invention the tube 10 is fired in response to vibrational displacement of the body undergoing test by simple an inexpensive means. This means comprises, as already indicated, the power supply means 14, the transformer 16, and the switch means 18. The switch means is normally closed with the result that current normally flows through the primary winding 50 of the transformer. The switch means opens the circuit through the primary winding in response to the vibrational displacement and at a time when the displacement is zero, with the result that the high voltage is induced in the secondary winding 52 of the transformer and is applied to the grid 40 of the tube 10, thereby to fire or trigger the tube. The grid is connected to one terminal of the secondary winding by conductor 54 and the other terminal of the winding is grounded by conductor 56.

The power supply means 14 includes a full wave copper oxide type rectifier 58 supplied with alternating current from the secondary winding 60 of transformer 27. One output terminal of the rectifier is grounded by conductor 62 and the other is connected by conductor 64 to one terminal of the primary winding 50 of transformer 60. The other terminal of this winding is connected by conductor 66 to the switch means 18, which includes a movable switch contact 68 normally engaging a fixed but adjustable switch contact 70 connected to ground through conductor 72.

The movable contact of the switch means is operatively connected to the body undergoing test and periodically opened in response to vibrational displacement of the body by switch operating and centering means, indicated as a whole by reference character 74, and comprising an arm 76 through which the movable switch contact 68 is opened. This means will be described in greater detail shortly.

The meter 20 is of conventional construction and its associated rectifier 24 may be, and is illustrated as being, a full wave copper oxide rectifier. The rectifier is supplied with alternating current by the generating means 22 which includes a stationary coil 78 and core 80 and a pair of permanent magnets 82 movable relative to the core in response to vibrations of the body undergoing test by the switch operating and centering means 74, as will be described in greater detail hereinafter.

The switch actuating and centering means 74, the switch means 18, and the voltage generating means 22 are constructed as a unit, which is illustrated best in Figs. 2 to 5 to which reference will now be had. The unit includes a supporting base or bracket 84 bolted to a pedestal 85. The various apparatus are mounted on the bracket 84 and are adapted to be enclosed by a cover (not shown). The adjustable fixed contact 70 is secured to the bracket 84 by the interconnected supporting blocks 86 and 88, of which the latter is secured to a transverse lug 90 preferably formed integrally with the bracket 84. The supporting block 86 is provided with a threaded aperture adjustably to receive the contact 70 which is provided with a threaded lower portion 91 and an adjusting knob 92 of insulating material. The fixed contact 70 and the supporting blocks 86 and 88 are preferably made of conducting material as is the bracket 84 whereby the contact 70 is grounded (they thus constitute the equivalent of conductor 72 in Fig. 1).

Undesired movement of the contact 70 is prevented by a spring 94 bearing against supporting block 86 and a washer 96 bearing against the underside of knob 92.

One of the important features of the present invention resides in the construction of the switch 18 so that the movable switch contact 68 is disengaged from the fixed contact 70 at the center of the vibrational displacement, and preferably at the center of displacement on the downward stroke, and furthermore, to associate with the switch self-centering means whereby the movable switch contact is centered without any necessity of manual resetting when the position of the body undergoing test changes during the test. For example, in the testing of automobile wheels, the jacked-up car may tip or settle during the testing operation. The present invention eliminates the necessity of any resetting of the switch means in this event.

The switch operating and centering means includes resilient means tending to move the movable contact 68 to a predetermined position and hydraulic means associated with it through which it is operated enabling the spring means to move the movable contact in the event the car settles or tips or is otherwise moved during test. This resilient means includes two pairs of spring leaves 98 and 102 secured to the opposite ends of the bracket 84. The spring leaves are easily secured to the bracket as by the fastening plates 104 and 106, respectively, which are bolted to the lug 90 and a coil supporting structure 108. However, a single spring may be used at each end, if desired, and if this is done then the upper one would have to be apertured for the passage of contact 70 and spring 94.

The free ends of the spring leaves 98 and 102 are interconnected by a rigid support 110, the opposite ends of which are bent in the same direction and secured to the spring leaves 98 and 102 by means including the fastening plates 112 and 114, respectively. The movable contact 68 is secured to the support 110 by the actuating member 76 which is secured to the inner side of the support in suitable manner as by a pair of rivets 116. The contact 68 is mounted in a spool 118 of insulating material having a flange 120 at its upper end and an insulating washer 122 located below it, and effectively insulating the contact from the support 76 and the associated cylindrical guide 124 within which the spool and contact are movably mounted.

While the contact 68 ordinarily moves with supports 76 and 110, the contact is mounted for relative movement with respect to its supporting structure so that the contacts will be engaged when the supporting structure moves upwardly and will not be injured in the event the support moves an undue distance and to enable the contacts 68 and 70 to be maintained in engagement during adjustment, as will be described hereinafter. The relative movement is provided by making the guiding sleeve 124 somewhat shorter than the spool 118 while holding contact 68 normally against movement relative to the sleeve by a spring 126 bearing against supporting arm 76 and the underside of the flange 120 at the upper end of spool 118. The contact 68 projects below the washer 122 so that it may readily be connected to conductor 66.

The movable contact 68 is operatively connected to the body undergoing test through the previously referred to switch actuating and centering means 74. The latter includes, in the main, a cylinder containing housing 130 secured in suitable manner to the movable contact support 110 and within which is mounted a piston 132 and filled with hydraulic fluid, and a two part telescopically adjustable connector 134, 136, the former of which has a permanent magnet 138 at its upper end for attachment to a part of the supporting structure for the wheel undergoing test and the latter of which is fixedly secured, as by welding, to the piston 132.

The magnet 138 is preferably a permanent magnet of the sintered alloy type. It is suitably secured to the rod 134, as by the fork 140.

The connector parts 134 and 136 may be moved telescopically to adjust the length of the connector so that the apparatus can be so located that the piston 132 is somewhere in the vicinity of the middle of its travel in the cylinder. The two parts are held in adjusted position by clamping means comprising knob 142 and an associated clamping element 144 encircling the upper split end of connector portion 136.

The piston 132 is movable in the cylinder in the housing 130—the cylinder being indicated by reference character 146. The cylinder is filled with hydraulic fluid (which may be a brake fluid) and the supply of fluid within the cylinder is maintained, in order to provide good operation, from a reservoir 148 communicating with the cylinder through small openings 150 and 152 near opposite ends of the cylinder. In order better to insure that the cylinder will be filled with liquid, the liquid in the reservoir is maintained under pressure by suitable means, such as a spring pressed diaphragm 154. The latter includes a flexible outer portion 156 and a relatively rigid central portion 158, and is pressed inwardly by a spring 160 bearing against its central portion. The compression of the spring is adjustable by a screw 162 movably mounted within a reservoir cover 164 suitably secured to the housing 130 as by staking 166.

Leakage from the cylinder along the connector 136 is prevented by sealing structures 170 of identical construction and of which but one will be described. These structures include inner closure plates 172, outer closure plates 174, intermediate spacers 176, and opposed tapered seals 178 and 180 separated by a ring 182. The seals 178 and 180 are preferably made of suitable material such as synthetic rubber, and they are located in opposed relation so that the diverging wings thereof prevent flow in both directions, i. e., the seal 178 prevents outward flow of liquid and the seal 180 prevents inward flow of air. It may be noted that the inner closure plate 172 bears against a shoulder 184 in the housing 130 while the outer one bears against a gasket 186 abutting against another shoulder in the housing. The outer plate is secured to the housing as by staking 188, see particularly Fig. 4.

The voltage generating means is also secured to the bracket 84. The coil 78 is wound on the core 80 and the assembly is secured to the outer end of bracket 108, see Fig. 2. The permanent magnets 82 are secured to the movable support 110 in spaced relation by a supporting plate 190 and screws 192 adapted to be threaded into the plate, thereby firmly to hold the magnets against the inside of the support 110. The magnets are located between the opposite legs of the core 80 and in such manner that as one magnet moves toward the core legs, the other moves away from it. The plate 190 and also support 110 are made of nonmagnetic material to prevent magnetic shorting of the magnets.

A modified embodiment of the switch actuating and centering means is illustrated in Figs. 6, 7 and 8, to which reference is now had. The means is indicated as a whole by the reference character 200 and it comprises a housing 202 defining a central cylinder 204 in which the piston 132 attached to the connector 136 is located. The cylinder is filled with hydraulic fluid and, in accordance with another feature of the invention, the hydraulic fluid is prevented from leaking along connector 136 by bellows sealing units 206 and 208 of like construction and secured to opposite ends of the cylinder housing 202.

The housing includes an integral base 210 whereby the unit can be secured to the switch support 110 as by a plurality of screw bolts 214.

The bellows seals 206 and 208 are of identical construction so that only one of them will be described. Accordingly, only bellows sealing unit 206 will be described. It includes the resilient bellows 216, the outer end of which is secured to a central rigid closure plate 220 fixedly secured as by a press fit to the rod 136 and to the outer portion of which the inturned end of the bellows is secured as by a washer 222 secured to the closure plate 220. The opposite end of the bellows is similarly secured to an internally threaded sleeve-like member 224. The latter is provided with a peripheral flange 226 between which and a washer 228 the inner end of the bellows is secured. A guide sleeve 230, within which connector 136 is reciprocable, threadedly receives sleeve 224. The guide sleeve is secured as by a press fit to a valve receiving coupling 232 by means of which the bellows and guide are secured to the end of the cylinder housing 202 as by a plurality of screw bolts 234. Leakage between the housing and the coupling member 232 is prevented by a gasket 236 located between them. A gasket 238 is interposed between members 232 and 224.

A check valve preventing flow of hydraulic fluid from within the cylinder 204 into the bellows and enabling liquid to flow from the bellows to the cylinder is mounted at the end of the cylinder and in the coupling member 232. The valve includes an annular spring pressed valve member 238 bearing against spaced annular ridges 240 formed at the inner end of the guide sleeve 230 and between which are a plurality of conduits 242 providing communication between the valve and the interior of the bellows. The valve member is biased against the ridges by a spring 244 which bears against the valve member and against a collar 246 secured to the coupling member 232.

Leakage of liquid from the unit is thus prevented by the bellows and the flow of liquid to the bellows from within the cylinder is prevented by the spring pressed valve 240. However, liquid from within the bellows is readily returnable to the cylinder past the valve member which forms, in effect, a one way valve permitting flow from the bellows to the cylinder.

In both embodiments of the invention, the piston 132 fits relatively closely within its associated cylinder and is lightly biased toward a normal position substantially centrally lengthwise of the cylinder. In the first described embodiment, it is so biased by opposed springs 250 and in the second embodiment it is so biased by the opposed bellows 216.

The construction of the centering unit is such that when the rod 136 and piston 132 are vibrated, as by the normal vibrations of the body undergoing test, the housing 130 within which the piston is mounted moves as a unit with it, thereby to impart vibrational movement to the movable switch support 110. However, should the body undergoing test tip or move downwardly or upwardly thereby to move the rod 136 in that direction, the piston will initially move its associated housing in the corresponding direction, but the housing will be returned to its initial position by the leaf springs 98 and 102 secured to the support 110. As a result the movable switch contact is made self-centering and is, in effect, automatically centered by the switch actuating and centering means.

The operation of the apparatus will now be described. In testing a rotating body, such as an automobile wheel, for static balance, the automobile is first jacked up so as to lift the wheel to be tested off the ground. The switch unit is then placed to bring the magnet 138 into contact with the knee action control arm or axle of the wheel, and the telescoping connections 134 and 136 and adjusted so that the piston is located approximately midway of its associated cylinder. When this adjustment has been made, the clamping knob 142 is rotated to clamp the rod portions 134 and 136 securely together.

The power is then supplied to the primary winding 26 of transformer 27, thereby to condition the apparatus for operation. Before actually testing the wheel, the contact 70 is adjusted so that the lamp just flashes. This is done by first moving the contact 70 downwardly so as to maintain it in engagement with the contact 68. This can be done readily because the contact 68 is movable downwardly against the bias of spring 126. Then the contact 70 is raised to a point where it just disengages contact 68—this point being indicated by flashing of the tube 10— it being remembered that the tube is fired when the contacts are disengaged and the circuit therethrough is opened to interrupt the flow of current through the primary winding 50 of transformer 16.

The next step in the test is to rotate the wheel. The wheel, as already indicated, is preferably rotated to a speed above a resonant speed and then allowed to decelerate freely and the apparent position of the wheel is noted at the resonance point. This point may be readily determined by the reading of ammeter 20 which reads a maximum at a resonance point. Should the position of the wheel move during the test, and this may likely occur when the wheel is rotated, the arm 134, 136 will move with the wheel and thereby move the piston 132 upwardly or downwardly corresponding to the movement of the wheel. Normally the vibrations of the wheel move the piston 132 a limited extent and so rapidly that its movements are imparted to the housing and switch support and movable contact 68. The engagement between the movable contact and fixed contact is broken during the downward movement of the vehicle and at a time when the displacement is zero because of the previous adjustment of the switch contacts so that the contact 68 was just disengaged from contact 70 when the vehicle was not moving. Inasmuch as the vibrational excursions are in both directions from this central point, contact 68 is disengaged from the contact 70 at the zero displacement point in a downward direction. However, should the position of the wheel move as contemplated above, then the piston moves either up or down a certain distance in addition to its vibrational movement. If this movement is sufficiently slow, the housing will not move with the wheel and piston, but ordinarily the movement is sufficiently fast to move the housing. In so moving the housing flexes the springs 98 and 102 from their normal position. Then after the downward or upward movement, as the case may be, is completed, the springs move the housing back to its initial position so that the contact 68 will again be disengaged from contact 70 at the time of zero displacement in a downward direction.

In testing for dynamic unbalance, the connector 134, 136 is secured as against the brake drum and in a horizontal position. After the magnet has been attached to the drum, the rod 134, 136 is again adjusted to locate the piston 132 approximately midway of its travel and the fixed contact 70 is then again adjusted as described above. The necessity for making this adjustment arises from the fact that in the horizontal position, the weight of the movable switch contact and its associated actuating and centering means does not flex the springs downwardly, as they do in vertical position, with the result that a different adjustment of the fixed contact is required.

In the case of the first embodiment of the invention, the cylinder is completely filled with the hydraulic fluid by virtue of the fact that the cylinder is connected to the reservoir and fluid in the reservoir is maintained under slight pressure by the spring 160. In the case of the second embodiment, the system is filled with hydraulic fluid and the fluid cannot escape because of the sealed bellows.

While the present invention has been described in connection with the details of two embodiments thereof, it should be understood that these details are not intended to be limitative of the invention, except in so far as set forth in the accompanying claims.

What I claim as new and desire to secure by Letters Patent of the United States is:

1. Apparatus for checking the locus of unbalance of a body including a stroboscopic light source, means including a transformer, a source of power for the transformer and switch means comprising fixed and movable contacts connecting the transformer to said source of power for flashing said light source, a support for said fixed contact, a support for said movable contact, means resiliently and movably connecting said last mentioned support to said first mentioned support, a cylinder supported upon said second mentioned support, a piston movably mounted within said cylinder, a connector fixedly secured to said piston adapted operatively to connect said piston to the body, fluid within said cylinder, and means forming a restricted bypass around the piston, said piston fitting relatively closely within said cylinder and said fluid being such that vibrations imparted to the piston are imparted to the cylinder and movable contact whereas translatory movement in one direction or another imparted to said piston may initially move said movable contact but said resilient connecting means returns it to its initial position by forcing the fluid to flow through the restricted bypass.

2. Apparatus for checking the locus of unbalance of a body including a stroboscopic light source, means including a transformer, a source of power for the transformer and switch means comprising fixed and movable contacts connecting the transformer to said source of power for flashing said light source, a support for said fixed contact, a support for said movable contact, means resiliently and movably connecting said last mentioned support to said first mentioned support, a cylinder supported upon said second mentioned support, a piston movably mounted within said cylinder, a connector fixedly secured to said piston adapted to connect said piston to the body, closure means including fluid seals at opposite ends of said cylinder, biasing means engaging said piston biasing said piston toward the center of the cylinder, fluid within said cylinder, and means forming a restricted bypass around the piston, said piston fitting relatively closely within said cylinder and said fluid being such that vibrations imparted to the piston are imparted to the cylinder and movable contact whereas translatory movement in one direction or another imparted to said piston may initially move said movable contact but said resilient connecting means returns it to its initial position.

3. Apparatus for checking the locus of unbalance of a body including a stroboscopic light source, means including a transformer, a source of power for the transformer and switch means comprising fixed and movable contacts connecting the transformer to said source of power for flashing said light source, a support for said fixed contact, a support for said movable contact, means resiliently and movably connecting said last mentioned support to said first mentioned support, a cylinder supported upon said second mentioned support, a piston movably mounted within said cylinder and a connector fixedly secured to said piston adapted to connect said piston to the body, closure means including resilient bellows secured to said connector and to opposite ends of said cylinder, fluid within said cylinder and bellows and means forming a restricted bypass around the piston, said piston fitting relatively closely within said cylinder and said fluid being such that vibrations imparted to the piston are imparted to the cylinder and movable contact whereas translatory movement in one direction or another imparted to said piston may initially move said movable contact but said resilient connecting means returns it to its initial position.

4. Apparatus as claimed in claim 3 wherein one way valve devices are located between each of said bellows and the cylinder.

5. In an apparatus for locating the center of unbalance of a rotating body by analyzing the vibrations thereof, the combination of a stroboscopic light source, a vibration pickup unit coupled thereto having resiliently coupled first and second members which are relatively movable to flash the light source, means to provide a stationary support for the second member, a cylinder, a piston reciprocable in the cylinder, a quantity of liquid filling the cylinder to transmit vibrations between the piston and the cylinder, means including the wall of the cylinder forming a restricted passageway between the spaces in the cylinder upon opposite sides of the piston to permit slow passage of the liquid around the piston, and means to connect one of the piston or the cylinder to the body for vibration in unison therewith, the first member being connected with the other of the piston or the cylinder for vibration in unison therewith.

6. In an apparatus for locating the center of unbalance of a rotating body by analyzing the vibrations of a body, the combination of a stroboscopic light source, a vibration pickup unit coupled to the light source having first and second members which are relatively movable to flash the light source, a stationary support for the second member, a part including a cylinder, a part comprising a piston reciprocable in the cylinder, a quantity of liquid filling the cylinder to transmit vibrations between the piston and cylinder, means providing a restricted passageway bypassing the piston to permit slow relative shifting of the piston and cylinder, means to connect one of said parts to the rotating body for vibration in unison therewith, means connecting the other of said parts to said first member, and resilient means connecting the first member to the support.

7. Apparatus for checking the locus of unbalance of a vibrating body including a stroboscopic lamp, and means including a transformer connected to said lamp, a source of electrical energy, and two-part switch means connecting said transformer to the source of electrical energy and operable to vary the energization of said transformer for causing the lamp to flash, actuating means for one part of the switch means comprising a cylinder connected to said part, hydraulic fluid in said cylinder, a piston longitudinally movable in the cylinder and adapted to be operatively connected to the body, means forming a restricted bypass around the piston, a fixed support carrying the other part of said switch means, and resilient means connected between the support and the cylinder.

8. Apparatus for checking the locus of unbalance of a vibrating body including a stroboscopic lamp, a transformer electrically connected to said lamp, a source of electrical energy, and switch means having a stationary part and a movable part to connect the transformer to the source of electrical energy and operable to vary the energization of the transformer to cause flashing of the lamp, resilient means connecting said switch parts, actuating means for the switch means adapted operatively to connect the movable part of said switch means to the body, said actuating means including a cylinder connected to the movable part of the switch means, a piston reciprocable in the cylinder and adapted to be mechanically connected to the body, hydraulic fluid in the cylinder forming means to transmit rapid vibrations from the piston to the cylinder, means including the cylinder wall forming a restricted passageway from one side of the piston to the other, and a fluid reservoir connected to the cylinder.

9. Apparatus as set forth in claim 8, in which the reservoir includes a spring pressed yieldable wall to maintain the fluid in the reservoir under pressure.

10. In an apparatus for locating the center of unbalance of a rotating body by analyzing the vibrations of the body, the combination of first and second adjacent relatively movable members, means mechanically coupling the first member to the body so that it will vibrate in unison therewith, a quantity of liquid sufficiently confined between the first and second members to transmit vibration from the first to the second member while permitting slow relative shifting of these members, a stroboscopic light source, a pickup unit elecrically coupled to the light source to cause the latter to flash at a predetermined point of each vibratory cycle of the body, said pickup unit having relatively movable first and second parts, means for supporting the first part in fixed position, means connecting the second part to the second member for vibration in unison with the latter, and resilient means connecting the first and second parts, said resilient means being yieldable to permit the second part to move in either sense from a normal position substantially in the direction of the vibratory motion of the body and being of sufficient strength to restore the second part to normal position relative to the first part against the frictional forces tending to resist relative movement of the first and second members.

11. In an apparatus for locating the center of unbalance of a rotating body by analyzing the vibrations thereof, the combination of a stroboscopic light source, a vibration pickup unit electrically coupled to the light source and having first and second parts which are relatively movable to cause the light source to flash at a predetermined point in each vibratory cycle, relatively strong resilient means acting between the first and second parts to bias them against relative movement from a normal position in either direction, a stationary support for the first part, self-centering actuating means including first and second adjacent relatively movable members and a quantity of fluid confined between the movable means to transmit vibrations therebetween while permitting slow relative shifting thereof, relatively weak resilient means acting between the first and second members to bias them against relative movement in either direction from a central position, rigid means connecting the second part of the pickup unit to the second movable member, and means to connect the first member to the vibratory body for vibration in unison therewith.

12. In an apparatus for locating the center of unbalance of a rotating body by analyzing the vibrations thereof, the combination of a stroboscopic light source, a vibration pickup unit electrically coupled to the light source, having first and second parts which are relatively movable to control the flashing of the light source, springs interconnecting said parts, a stationary support for the second part, a member comprising a cylinder, a member comprising a piston reciprocable in said cylinder, said cylinder and piston being constructed to provide a restricted passageway between the ends of the cylinder, a connector fixedly secured to the piston and extending through the cylinder, cylinder end closure means including a pair of resilient bellows secured between the connector and the ends of the cylinder respectively, a quantity of fluid filling the cylinder, a pair of check valve and conduit means respectively connecting the bellows to the ends of the cylinder to permit flow of fluid from the bellows to the cylinder and prevent flow in the opposite direction, and means mechanically connecting one of said members to the first vibration pickup part for vibration in unison therewith.

ARTHUR C. ALLEN.

References Cited in the file of this patent

UNITED STATES PATENTS

| Number | Name | Date |
|---|---|---|
| 701,983 | Yale | June 10, 1902 |
| 1,016,833 | Larson | Feb. 6, 1912 |
| 1,279,972 | Berry | Sept. 24, 1918 |
| 1,797,235 | Kasley | Mar. 24, 1931 |
| 1,867,413 | Lee | July 12, 1932 |
| 1,912,776 | Kuhn | June 6, 1933 |
| 2,023,244 | Schnaitter | Dec. 3, 1935 |
| 2,092,096 | Swedlund | Sept. 7, 1937 |
| 2,130,122 | Dybvig | Sept. 13, 1938 |
| 2,301,291 | Kolesnik | Nov. 10, 1942 |
| 2,323,352 | Pitts | July 6, 1943 |
| 2,328,114 | Weaver et al. | Aug. 31, 1943 |
| 2,383,405 | Merrill | Aug. 21, 1945 |
| 2,453,855 | Oliver | Nov. 16, 1948 |
| 2,548,809 | Norman | Apr. 10, 1951 |